(12) United States Patent
Goebel et al.

(10) Patent No.: US 8,158,288 B2
(45) Date of Patent: Apr. 17, 2012

(54) RELATIVE HUMIDITY CONTROL FOR A FUEL CELL

(75) Inventors: Steven G. Goebel, Victor, NY (US); William H. Pettit, Rochester, NY (US); John C. Fagley, Victor, NY (US); Lee C. Whitehead, Middleport, NY (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 13/092,223

(22) Filed: Apr. 22, 2011

(65) Prior Publication Data
US 2011/0207010 A1 Aug. 25, 2011

Related U.S. Application Data

(62) Division of application No. 11/130,825, filed on May 17, 2005.

(51) Int. Cl.
*H01M 8/06* (2006.01)
*H01M 8/04* (2006.01)
(52) U.S. Cl. .................... 429/413; 429/428; 429/433
(58) Field of Classification Search .................. None
See application file for complete search history.

(56) References Cited

U.S. PATENT DOCUMENTS

| | | | |
|---|---|---|---|
| 4,769,297 | A | 9/1988 | Reiser et al. |
| 5,441,819 | A | 8/1995 | Voss et al. |
| 5,503,944 | A | 4/1996 | Meyer et al. |
| 5,547,776 | A | 8/1996 | Fletcher et al. |
| 5,773,160 | A | 6/1998 | Wilkinson et al. |
| 6,117,577 | A | 9/2000 | Wilson |
| 6,376,111 | B1 * | 4/2002 | Mathias et al. ............ 429/413 |
| 6,524,733 | B1 | 2/2003 | Nonobe |
| 6,528,194 | B1 | 3/2003 | Condit et al. |
| 6,562,501 | B1 | 5/2003 | Nagamiya et al. |
| 6,566,001 | B2 | 5/2003 | Yosida et al. |
| 2004/0157098 | A1 | 8/2004 | Wexel et al. |
| 2004/0170878 | A1 | 9/2004 | Goebel |
| 2005/0037243 | A1 | 2/2005 | Dubel et al. |
| 2006/0134472 | A1 * | 6/2006 | Bach et al. ............ 429/13 |

FOREIGN PATENT DOCUMENTS

KR 1020050025491 * 1/2006

OTHER PUBLICATIONS

Fagley, John; Gu, Wenbin; and Whitehead, Lee, "Thermal Modeling of a PEM Fuel Cell," pp. 141-149, published by ASME in "Fuel Cell Science, Engineering and Technology," Jun. 2004. U.S. Appl. No. 11/130,804, filed May 17, 2005, Fagley et al., "Relative Humidity, Profile Control Strategy for High Current Density Stack Operation".
U.S. Appl. No. 11/130,806, filed May 17, 2005, Victor W. Logan, "Fuel Cell System Relative Humidity".
U.S. Appl. No. 11/130,807, filed May 17, 2005, Sinha et al., "Management via Dynamic Water Holdup Estimator in a Fuel Cell".

* cited by examiner

*Primary Examiner* — Barbara Gilliam
*Assistant Examiner* — Angela Martin
(74) *Attorney, Agent, or Firm* — Harness, Dickey & Pierce, P.L.C.

(57) ABSTRACT

A model uses various operating characteristics of a fuel cell to predict the relative humidity profile that is occurring within the fuel cell as a function of the reaction progress. The model is used to predict the relative humidity profile that will occur in response to changes to one or more of the operating characteristics of the fuel cell. A high frequency resistance of the fuel cell can also be used as a measure that is indicative of the humidity within the fuel cell. The model and/or the high frequency resistance can be used in a closed-loop feedback system to control the operation of the fuel cell to maintain the humidification of the MEA and fuel cells within a desired range to achieve a desired fuel cell performance.

7 Claims, 4 Drawing Sheets

RELATIVE HUMIDITY CONTROL FOR A FUEL CELL

CROSS-REFERENCE TO RELATED APPLICATIONS

This application is a divisional of U.S. patent application Ser. No. 11/130,825 filed on May 17, 2005. The entire disclosure of the above application is incorporated herein by reference.

FIELD OF THE INVENTION

The present invention relates to fuel cells and, more particularly to controlling the relative humidity within fuel cells.

BACKGROUND OF THE INVENTION

Fuel cells are used as a power source for electric vehicles, stationary power supplies and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

PEM fuel cells comprise a plurality of the MEAs stacked together in electrical series while being separated one from the next by an impermeable, electrically conductive contact element known as a bipolar plate or current collector. In some types of fuel cells each bipolar plate is comprised of two separate plates that are attached together with a fluid passageway therebetween through which a coolant fluid flows to remove heat from both sides of the MEAs. In other types of fuel cells the bipolar plates include both single plates and attached together plates which are arranged in a repeating pattern with at least one surface of each MEA being cooled by a coolant fluid flowing through the two plate bipolar plates.

The fuel cells are operated in a manner that maintains the MEAs in a humidified state. The level of humidity of the MEAs affects the performance of the fuel cell. Additionally, if an MEA is run too dry, the MEA can be damaged which can cause immediate failure or reduce the useful life of the fuel cell. To avoid drying out the MEAs, the typical fuel cells are operated in a flooded condition wherein the humidity of the MEA is greater than 100% and liquid water is formed in the fuel cell during the production of electricity. Additionally, the cathode and/or anode reactant gases being supplied to the fuel cell are also humidified to prevent the drying of the MEAs in the locations proximate the inlets for the reactant gases.

The operation of the fuel cells with the MEAs humidified greater than 100%, however, limits the performance of the fuel cell stack. Specifically, the formation of liquid water impedes the diffusion of gas to the MEAs, thereby limiting their performance. The liquid water also acts as a flow blockage reducing cell flow and causing even higher fuel cell relative humidity which can lead to unstable fuel cell performance. Additionally, the formation of liquid water within the cell can cause significant damage when the fuel cell is shut down and is exposed to freezing conditions. That is, when the fuel cell is nonoperational and the temperature in the fuel cell drops below freezing, the liquid water therein will freeze and expand, potentially damaging the fuel cell.

Thus, it would be advantageous to control and operate the fuel cell in a manner that prevents and/or limits the formation of liquid water therein. It would be further advantageous if such a control or operation of the fuel cell resulted in the MEA being operated at a humidified state that results in optimum performance.

Controlling the operating conditions within the fuel cell, however, has proved to be difficult. Specifically, the measuring and controlling of the humidity of the gaseous reactant streams flowing into the fuel cell can be difficult. Traditionally, a water vapor transfer device (WVT) is utilized to humidify the cathode reactant gas prior to entering into the fuel cell. The operation of the WVT, however, is difficult to characterize and, as a result, the exact humidity of the cathode reactant gas flowing into the fuel cell may be difficult to ascertain. Thus, it would also be advantageous to control and operate a fuel cell with an improved understanding of the humidity of the cathode reactant gas flowing into the fuel cell.

SUMMARY OF THE INVENTION

The inventors of the present invention have developed a novel way of controlling the operation of a fuel cell and/or fuel cell stack that enables a desired relative humidity profile within the fuel cell stack to be achieved and maintained during operation. Specifically, the inventors have developed a model of the relative humidity in a fuel cell as a function of the reaction progress within the fuel cell. The model uses various operating characteristics of the fuel cell to predict the relative humidity profile that is occurring and/or will occur within the fuel cell. The model can be used to predict the relative humidity profile that will occur within the fuel cell in response to a change to one or more of the operating characteristics of the fuel cell. Additionally, a high frequency resistance of the fuel cell can be used as a measure that is indicative of the humidity of the MEA within the fuel cell. The high frequency resistance can be used in a closed-loop feedback system to control the operation of the fuel cell to maintain the humidification of the MEA within a desired range to achieve a desired fuel cell performance.

The methods of operating the fuel cells that are disclosed herein are utilized in fuel cells that have anode and cathode reactant flow paths which are separated by a protonic exchange membrane. The fuel cells also have a coolant path that is arranged in a substantially predominant co-flow arrangement with the cathode reactant flow path.

In one aspect of the present invention, a method of operating such a fuel cell to obtain a desired relative humidity profile within the fuel cell is disclosed. The method includes: (1) monitoring operating characteristics of the fuel cell; (2) ascertaining a relative humidity profile of the fuel cell as a function of reaction progress; and (3) adjusting at least one operating parameter of the fuel cell based on the ascertained profile to obtain a desired relative humidity profile in the fuel cell.

In another aspect of the present invention, the method includes: (1) monitoring a high frequency resistance of the fuel cell; (2) comparing the high frequency resistance to a predetermined standard or range; and (3) adjusting an operating parameter of the fuel cell to maintain the desired relative humidity in the fuel cell based upon the comparison, the operating parameter including at least one of a temperature change of a cathode reactant across the cathode flow path, a stoichiometric quantity of the cathode reactant flowing into the fuel cell, and a pressure drop across the cathode reactant flow path.

In still another aspect according to the principle of the present invention, a method of operating a fuel cell to avoid damage when shut down and exposed to temperatures below freezing is disclosed. The method includes: (1) monitoring a relative humidity level in the fuel cell during operation; and (2) maintaining a relative humidity within the fuel cell at less than 100% during operation of the fuel cell at nominal operating temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
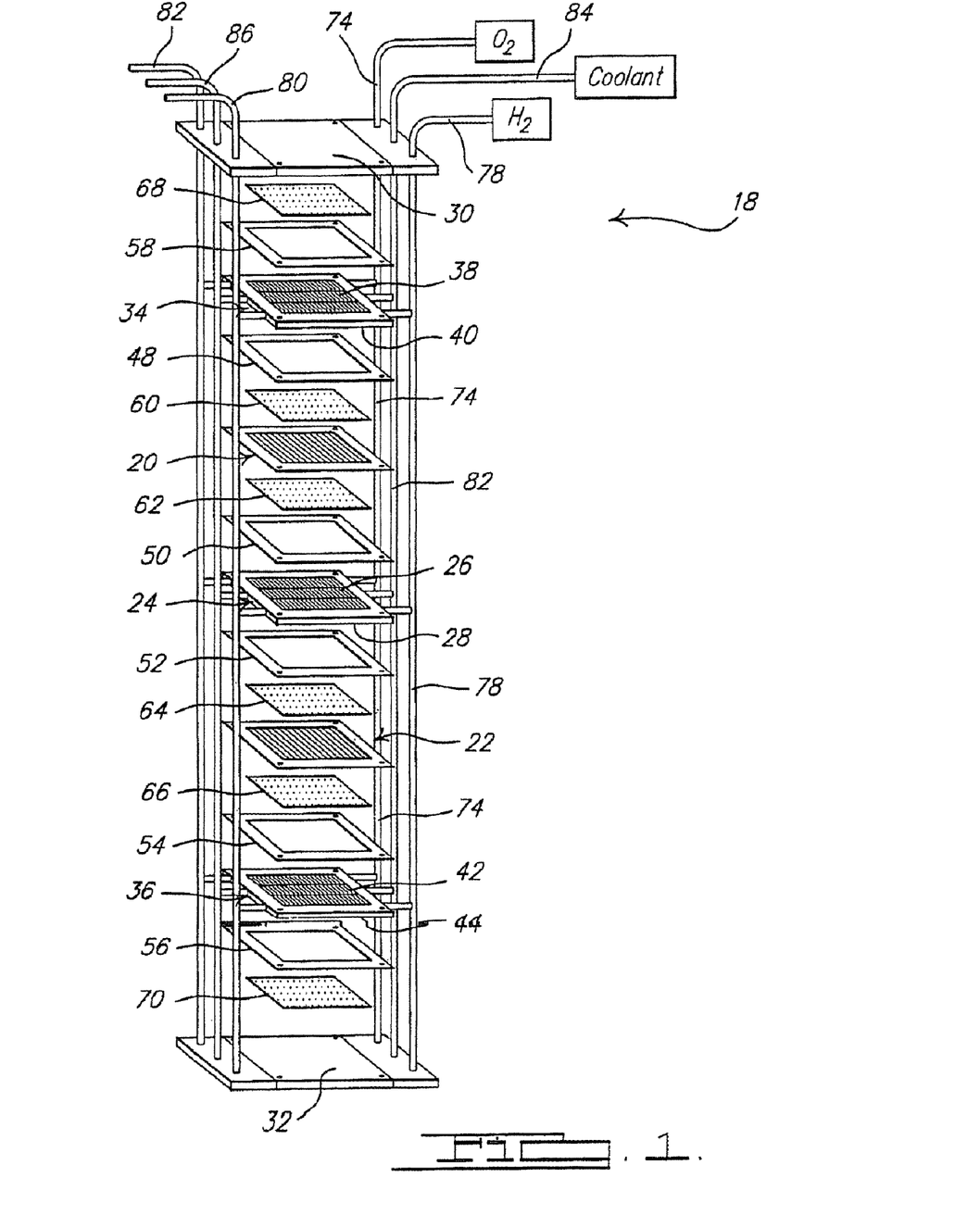
FIG. 1 is a schematic, exploded, isometric, illustration of an exemplary liquid-cooled PEM fuel cell stack (only two cells shown)
Figure 2:
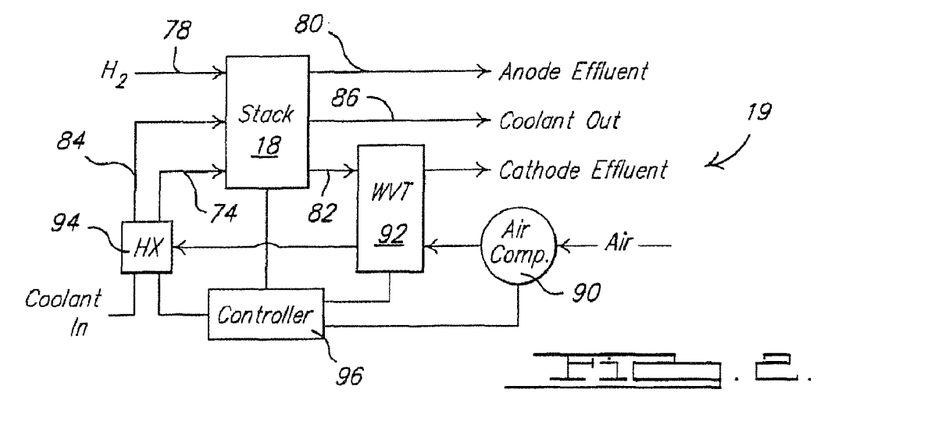
FIG. 2 is a schematic representation of a partial configuration of a fuel cell system having a liquid-cooled PEM fuel cell stack such as the one shown in FIG. 1.

To gain a better understanding of the present invention, an exemplary fuel cell stack 18 and fuel cell system 19 where the present invention may be employed are shown in FIGS. 1 and 2. FIG. 1 depicts two individual proton exchange membrane (PEM) fuel cells connected to form a stack 18 having a pair of membrane-electrode-assemblies (MEAs) 20, 22 separated from each other by an electrically conductive, liquid-cooled, bipolar separator plate conductive element 24. An individual fuel cell, which is not connected in series within a stack, has a separator plate 24 with a single electrically active side. In a stack, a preferred bipolar separator plate 24 typically has two electrically active sides 26, 28 within the stack, each active side 26, 28 respectively facing a separate MEA 20, 22 with opposite charges that are separated, hence the so-called "bipolar" plate.

The MEAs 20, 22 and bipolar plate 24 are stacked together between stainless steel clamping terminal plates 30, 32 and end contact fluid distribution elements 34, 36. The end fluid distribution elements 34, 36, as well as both working faces or sides 26, 28 of the bipolar plate 24, contain a plurality of lands adjacent to grooves or channels on the active faces 38, 40, 26, 28, 42, and 44 and form flow fields for distributing anode and cathode reactants (i.e., $H_2$ and $O_2$/air) to the MEAs 20, 22. Nonconductive gaskets or seals 48, 50, 52, 54, 56, and 58 provide seals and electrical insulation between the several components of the fuel cell stack. Gas-permeable conductive diffusion media 60, 62, 64, and 66 press up against the electrode faces of the MEAs 20, 22. Additional layers of conductive media 68, 70 are placed between the end contact fluid distribution elements 34, 36 and the terminal collector plates 30, 32 to provide a conductive pathway therebetween when the stack is compressed during normal operating conditions. The end contact fluid distribution elements 34, 36 press up against the diffusion media 60, 68 and 66, 70 respectively.

Cathode reactant in the form of $O_2$/air is supplied to the cathode flow fields of the fuel cell stack 18 from a storage tank or from the ambient via appropriate supply plumbing 74. Similarly, the anode reactant in the form of $H_2$ is supplied to the anode flow fields of the fuel cell stack 18 from a storage tank, a methanol or gasoline reformer, or the like, via appropriate to supply plumbing 78. Exhaust plumbing 80, 82 for the anode and cathode effluents produced in the respective anode and cathode flow fields of fuel cell stack 18 is also provided. Additional plumbing 84 is provided for circulating coolant through the bipolar plate 24 and end plates 34, 36 and out via exit plumbing 86.

As used herein, the terms "fuel cell" and "fuel cell stack" may be used interchangeably. Furthermore, the terms "fuel cell" and "fuel cell stack" may mean a single individual fuel cell or multiple fuel cells arranged adjacent one another depending upon the context in which the term is used.

Referring now to FIG. 2, a partial configuration of a typical fuel cell system 19 is shown. The cathode reactant gas, in this case air from the ambient, is supplied to fuel cell stack 18 by a compressor 90. The cathode reactant gas flows from compressor 90 through a humidifying device 92, in this case in the form of a water vapor transfer device (WVT) wherein the cathode reactant gas is humidified. The cathode reactant gas then flows through an optional heat exchanger 94 wherein the cathode reactant gas can be heated or cooled, as needed, prior to entering fuel cell stack 18. The cathode reactant gas then flows through the cathode flow path in the fuel cells within fuel cell stack 18 and exits fuel cell stack 18 in the form of cathode effluent via cathode exhaust plumbing 82. The cathode effluent is routed through WVT device 92.

Within WVT device 92, humidity from the cathode effluent stream is transferred to the cathode reactant gas being supplied to fuel cell stack 18. The operation of WVT device 92 can be adjusted to provide differing levels of water vapor transfer between the cathode effluent stream and the cathode reactant stream.

Coolant is supplied to fuel cell stack 18 via coolant supply plumbing 84 and is removed from fuel cell stack 18 via coolant exit plumbing 86. The coolant flowing through fuel cell stack 18 is predominantly co-flow with the cathode reactant gas flowing therethrough. In other words, both the cathode reactant gas and the coolant flow in substantially the same direction and with one another through the fuel cells in fuel cell stack 18. The predominantly co-flow arrangement causes the coolant temperature and the cathode reactant gas temperature to be very close to one another if not identical as they flow through the fuel cell stack. It should be appreciated, however, that some deviations in the flow paths for the coolant and cathode reactant gas are allowed and still considered to be predominantly co-flow so long as the temperatures of the two flows are substantially the same as they progress through their flow paths in the fuel cell stack. For example, a serpentine flow path wherein the cathode reactant gas and/or the coolant flow in a serpentine manner through the fuel cells in fuel cell stack 18 may deviate from one another and still be considered co-flow providing the coolant and cathode reactant gas flow substantially together with only minor variations in their flow paths through each fuel cell in fuel cell stack 18. Optionally, the coolant can flow through heat exchanger 94 prior to entering fuel cell stack 18 thereby equalizing the temperature of the cathode reactant gas and the coolant prior to entering fuel cell stack 18.

A controller 96 communicates with air compressor 90, fuel cell stack 18, WVT device 92 and heat exchanger 94 to control and coordinate their operation. Controller 96 contains one or more modules, as needed, to control the operation of the various components of fuel cell system 19 to provide desired operation of fuel cell stack 18 and fuel cell system 19. Controller 96 may be a single integral controller or may be a plurality of discrete separate controllers having different functionalities. As used herein, the term "module" refers to an application specific integrated circuit (ASIC), an electronic circuit, a processor (shared, dedicated or group) and memory that execute one or more software or firmware programs, a combinational logic circuit, or other suitable components that provide the described functionality. Controller 96 implements the methods and control strategies of the present invention to provide the desired operation of fuel cell stack 18 and/or fuel cell system 19, as described in more detail below.

The present invention is directed to controlling the operation of a fuel cell stack 18 within a fuel cell system, such as that shown in FIG. 2. The operation of fuel cell stack 18 is controlled so that a desired relative humidity profile within the fuel cells in fuel cell stack 18 is achieved. The inventors have developed an equation (equation (1) below) that predicts the relative humidity profile within the cathode flow field of the fuel cells as a function of reaction progress. Equations (2)-(11) are used to solve equation (1). In these equations the following definitions are used:

$f$ is the reaction progress (from 0 to 1);

P is the local cathode pressure=$P_{in} - f \cdot dP$;

$P_{in}$ is the cathode inlet pressure;

dP is the cathode pressure drop and is taken to be linear with the reaction across the stack;

$P_{sat}$ and $P_{sat\,in}$ are the local and inlet cathode water vapor saturation pressures based upon the local temperature;

T is the local temperature=$T_{in} + f \cdot dT$;

$T_n$ is the coolant inlet temperature;

dT is the stack coolant temperature rise (coolant and cathode are considered co-flow);

St is the cathode stoichiometry, i.e. the amount of oxygen fed divided by the amount of oxygen consumed;

Air and $Air_{in}$ are the local and inlet molar flow rate of the cathode reactant stream on a dry (water-free) basis;

$O_2$, $O_{2\,in}$ and $O_{2\,out}$ are the local, inlet and outlet molar flow rate of molecular oxygen in the cathode reactant stream;

Water and $Water_{in}$ are the local and inlet molar flow rate of water in the cathode reactant stream; and $RH_{in}$ is the relative humidity of the cathode reactant provided at the cathode inlet.

Equations:

$$RH = \frac{1}{\left(1 + \frac{Air}{Water}\right)} * \frac{P}{P_{sat}} \qquad (1)$$

$$Air = Air_{in} - (O_{2in} - O_2) \qquad (2)$$

$$Water = Water_{in} + 2(O_{2in} - O_2) \qquad (3)$$

$$O_2 = O_{2in} - f(O_{2in} - O_{2out}) \qquad (4)$$

$$Water_{in} = \frac{Air_{in} * RH_{in}}{\frac{P_{in}}{P_{sat\,in}} - RH_{in}} \qquad (5)$$

$$(O_{2in} - O_{2out}) = \frac{O_{2in}}{St} \qquad (6)$$

$$Air_{in} = \frac{O_{2in}}{0.21} \qquad (7)$$

Using Equations (2) – (7) and simplifying $$\frac{Air}{Water} = \frac{\frac{St}{0.21} - f}{\frac{St}{0.21} * \frac{RH_{in}}{\left(\frac{P_{in}}{P_{sat\,in}} - RH_{in}\right)} + 2f} \qquad (8)$$

$$P = P_{in} - f * dP \qquad (9)$$

$$T = T_{in} + f * dT \qquad (10)$$

A curve fit for $P_{sat}$ is:

$$P_{sat}(kPa) = \exp\left(16.55 - \frac{3977}{(T(°\,C.) + 233)}\right) \qquad (11)$$

Using equations (8) and (11) the relative humidity (equation (1)) as a function of reaction progress ($f$) can be ascertained. The equations utilize a water mass balance and predict the relative humidity within the fuel cell at any stage in the reaction progress. Thus, equation (1) can be used as a model to predict the relative humidity within the fuel cell at any point as a function of the reaction progress. Based on the predictions of this theoretical model, control strategies for the operation of fuel cell stack 18 and fuel cell system 19 according to the principles of the present invention can be implemented, as described in more detail below.

Figure 3:
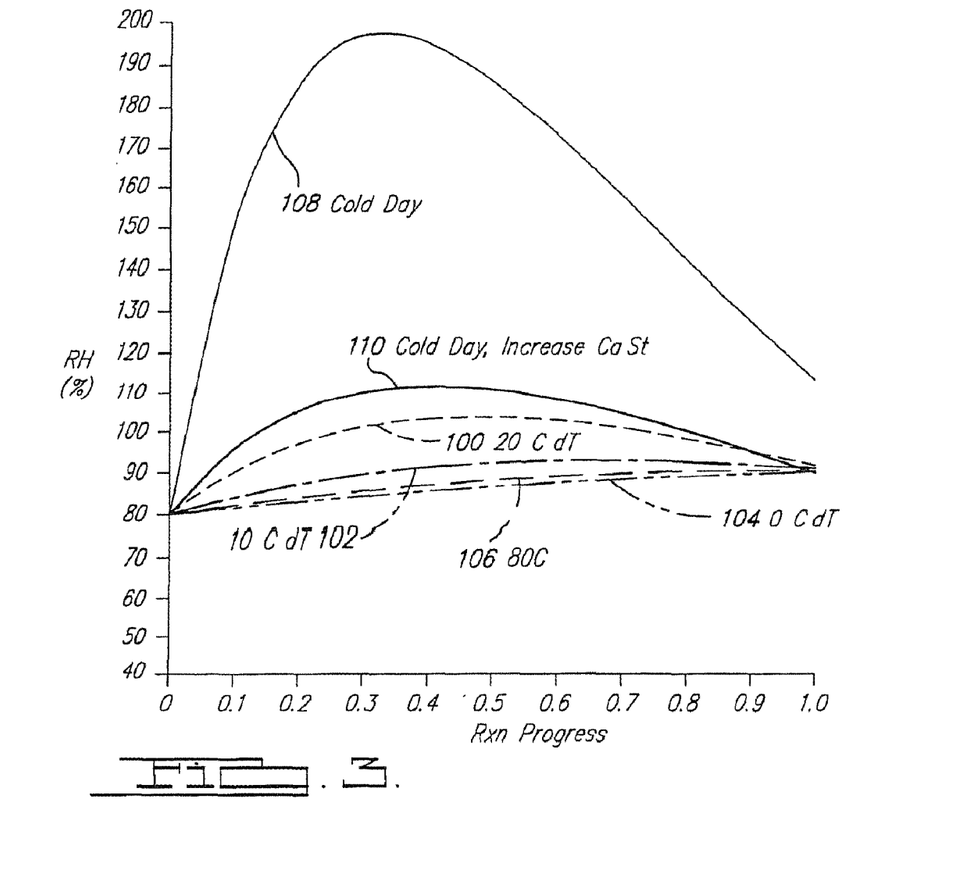
FIG. 3 is a graphical representation of the predicted relative humidity within a fuel cell as a function of reaction progress based on the model according to the principles of the present invention.

A graphical representation of the predicted (theoretical) relative humidity, based on equation (1), within the fuel cells for various operating conditions of the fuel cells as a function of reaction progress is shown in FIG. 3. The input and output values for various operating parameters used to generate the theoretical relative humidity profiles shown in FIG. 3 within the fuel cells are shown in Table 1.

TABLE 1

| Curve # | Cathode Stoichiometry | Pressure (kPa) | | Temp (C.) | | $RH_{in}$ |
|---|---|---|---|---|---|---|
| | | In | Out | In | Out | |
| 100 | 2 | 131 | 111 | 49 | 69 | 80 |
| 102 | 2 | 131 | 111 | 64 | 74 | 80 |
| 104 | 2 | 131 | 111 | 84 | 84 | 80 |
| 106 | 2 | 131 | 111 | 77 | 80 | 80 |
| 108 | 2 | 131 | 111 | 20 | 60 | 80 |
| 110 | 3 | 131 | 111 | 35 | 60 | 80 |

Curves 100, 102, 104 and 106 represent the relative humidity profile as a function of reaction progress through the fuel cell when the relative humidity of the cathode reactant flowing into the fuel cell is the same but the temperature differential across the fuel cell of the cathode reactant varies. As can be seen by looking at curves 100, 102, 104 and 106, the temperature differential in the cathode reactant gas across the fuel cell which is determined by the coolant temperature profile has a strong influence on the relative humidity profile within the fuel cell. Specifically, as the temperature differential between the cathode reactant flowing into the fuel cell and the cathode effluent flowing out of the fuel cell decreases, the relative humidity profile becomes more flat and the peak relative humidity within the fuel cell also decreases. Thus, by reducing the temperature differential across the fuel cell, the peak relative humidity can be reduced and the relative humidity profile as a function of the reaction progress can be flattened.

Referring now to curve 108, the effect of a cold day, wherein the cathode reactant inlet temperature is significantly less than the nominal operating temperature of the fuel cell, on the relative humidity profile as a function of reaction progress is shown. With this reduced inlet temperature, the water vapor holding capacity of the cathode reactant is significantly reduced. As a result, as water is produced during the reaction, the relative humidity of the cathode reactant flow increases rapidly and has a large peak and flooding occurs in the fuel cell. To avoid the large slope of curve 108 and/or the high peak in relative humidity, the temperature of the coolant flowing into the fuel cell can be increased. When starting up a fuel cell from a cold condition, however, the preheating of the coolant flow is a parasitic use of the power generated by the fuel cell and may not be a desirable option. As an alternative, the stoichiometric quantity of cathode reactant flowing into the fuel cell can be increased thereby increasing the water holding capacity of the cathode reactant gas flowing therethrough. Increasing the stoichiometric quantity, however, increases the energy expended by compressor 90 to supply the increased cathode reactant gas which is also a parasitic use of the power generated by the fuel cell stack. A balancing of the two different parasitic uses of power can be achieved by both increasing the stoichiometric quantity of cathode reactant flowing into the fuel cells and slowly increasing the temperature of the coolant as it flows into the fuel cell.

When both the stoichiometric quantity is increased and the temperature is increased, as shown in curve 110, the relative humidity profile and the peak relative humidity can be greatly reduced. The increase in the stoichiometric quantity and the increasing of the temperature can be balanced to reduce the parasitic use of power generated by the fuel cell and/or the power consumed by the fuel cell system when starting up the fuel cell stack from cold. Thus, on a cold day when starting up the fuel cell stack, the stoichiometric quantity can be increased, the temperature of the coolant flowing into the fuel cell can be increased or a combination of both to reduce the relative humidity profile and the peak relative humidity that occurs in the fuel cell stack.

Figure 4:
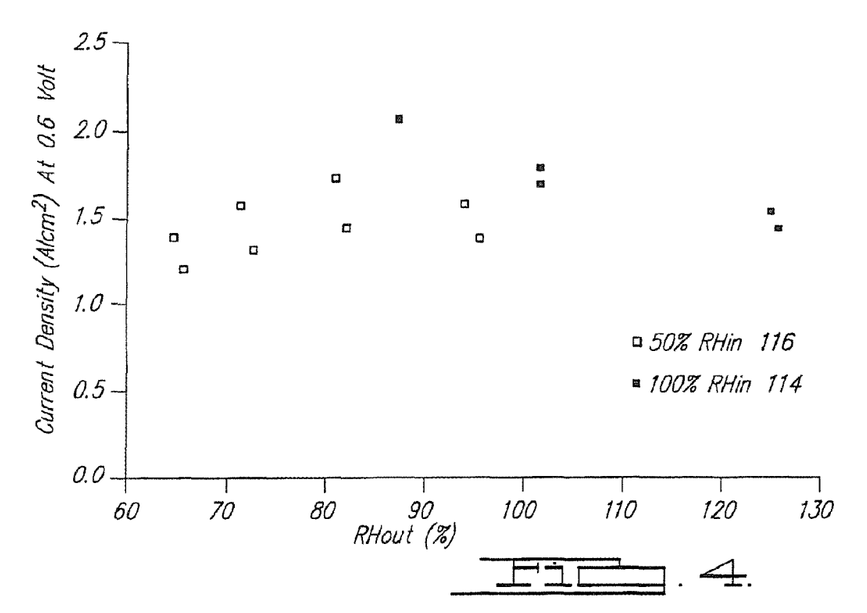
FIG. 4 is a graph of current density of a fuel cell as a function of the relative humidity of the cathode effluent gas exiting the fuel cell for various levels of humidification of the cathode reactant gas entering the fuel cell.

The performance of the fuel cells will vary depending upon the humidification of the MEAs therein. In other words, the electric current density produced by the fuel cells at a constant voltage will vary depending upon the humidification of the MEAs. Referring to FIG. 4, an exemplary graph of the current density of a fuel cell as a function of the relative humidity of the cathode effluent exiting the fuel cell for two levels of relative humidity of the cathode reactant entering the fuel cell is shown. Specifically, data points 114 represent the current density produced by the fuel cell at 0.6 volts with a cathode reactant having a 100% relative humidity flowing into the fuel cell for various levels of relative humidity of the cathode effluent exiting the fuel cell. Similarly, data points 116 represent the current density produced by the fuel cell at 0.6 volts with a cathode reactant having a 50% relative humidity flowing into the fuel cell for various levels of relative humidity of the cathode effluent exiting the fuel cell.

As can be seen by comparing the data points 114 to 116, the current density produced by the fuel cell increases as the relative humidity of the cathode effluent exiting the fuel cell approaches about 88% and decreases as the relative humidity in the cathode effluent exiting the fuel cell exceeds about 88%. It can also be seen that the current density has a larger magnitude when the relative humidity of the cathode reactant flowing into the fuel cell is 100% as compared to 50%. This data indicates that for this fuel cell peak current density is achieved at an optimum cathode effluent relative humidity out of about 80%-100%. The peak current density occurs at about 88%. Accordingly, it is desirable to operate the fuel cell with the cathode effluent exiting between about 80% to 100% and even more desirable to exit at about 88% with a cathode reactant inlet relative humidity of about 100%.

As stated above, the theoretical model predicts the relative humidity profile that will occur as a function of reaction progress within the fuel cells. The present invention uses the model to control operation of the fuel cell stack. Specifically, the model is used to determine adjustments to the operating parameters of the fuel cells that will result in a desired relative humidity profile occurring within the fuel cells. The operating parameters that are to be changed include: (1) temperature of the cathode reactant through the cathode reactant flow path via coolant temperature control; (2) stoichiometric quantity of cathode reactant flowing into the fuel cells; (3) pressure drop in the cathode reactant flowing through the cathode flow path; and/or (4) relative humidity of the cathode reactant flowing into the fuel cells. The impact of varying one or more of these parameters can be easily ascertained using the theoretical model of the relative humidity profile as a function of the reaction progress.

Figure 6:
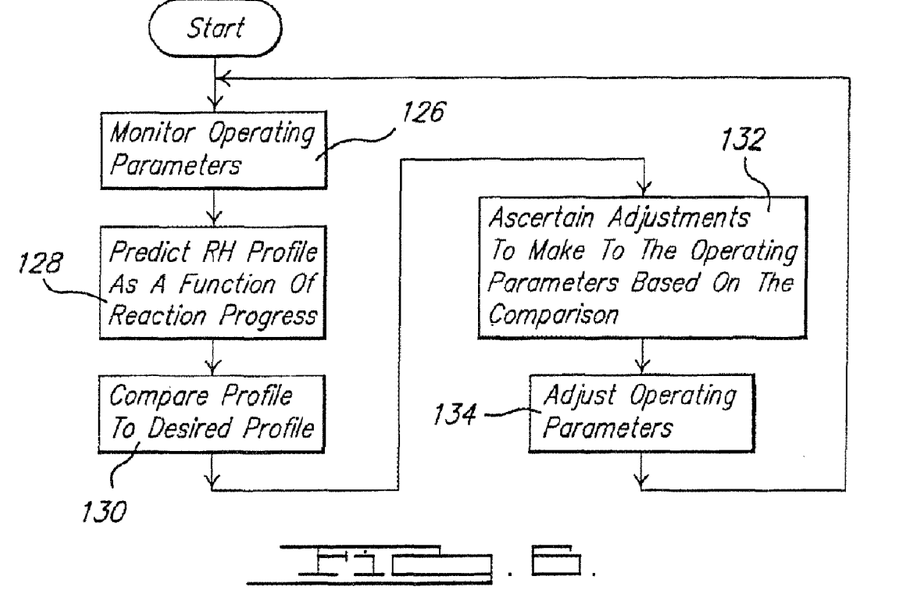
FIG. 6 is a flow chart illustrating the control of the fuel cell system based upon the model of the relative humidity profile of the present invention.

Referring to FIG. 6, a flow chart illustrating the control of fuel cell system 19 using the theoretical model of the present invention is illustrated. Controller 96 uses the theoretical model to maintain a desired relative humidity profile or range of relative humidity that occurs throughout the fuel cells within a desired range. Controller 96 monitors the operating parameters of fuel cell system 19, as indicated in block 126. Based upon these operating parameters, the model is used to predict the relative humidity profile as a function of reaction progress that will occur throughout the fuel cells, as indicated in block 128. The predicted relative humidity profile is compared to a desired relative humidity profile, as indicated in block 130.

The desired relative humidity profile can be set for various desired operating conditions of fuel cell stack 18. For example, fuel cell stack 18 can be operated to prevent flooding from occurring within the fuel cells and/or to achieve peak current densities. Additionally, the desired profile can vary based upon the current operational state of fuel cell stack 18. For example, during a cold start situation, the desired relative humidity profile may be different than when the fuel cell stack is operating at nominal operating temperatures. Furthermore, the desired profile can also vary based upon whether an up transient or down transient in power demand placed on fuel cell stack 18 is occurring.

Once the predicted relative humidity profile is compared to the desired profile, the theoretical model is used to ascertain the needed adjustments to the various operating parameters of fuel cell system 19, based on the comparison, as indicated in block 132. Controller 96 then adjusts the operating parameters to achieve the desired relative humidity profile, as indicated in block 134. This process continues throughout the operation of fuel cell system 19 and fuel cell stack 18. Thus, fuel cell system 19 and fuel cell stack 18 can be operated to achieve a desired relative humidity profile based upon the model of the present invention which predicts the relative humidity profile as a function of reaction progress.

Figure 5:
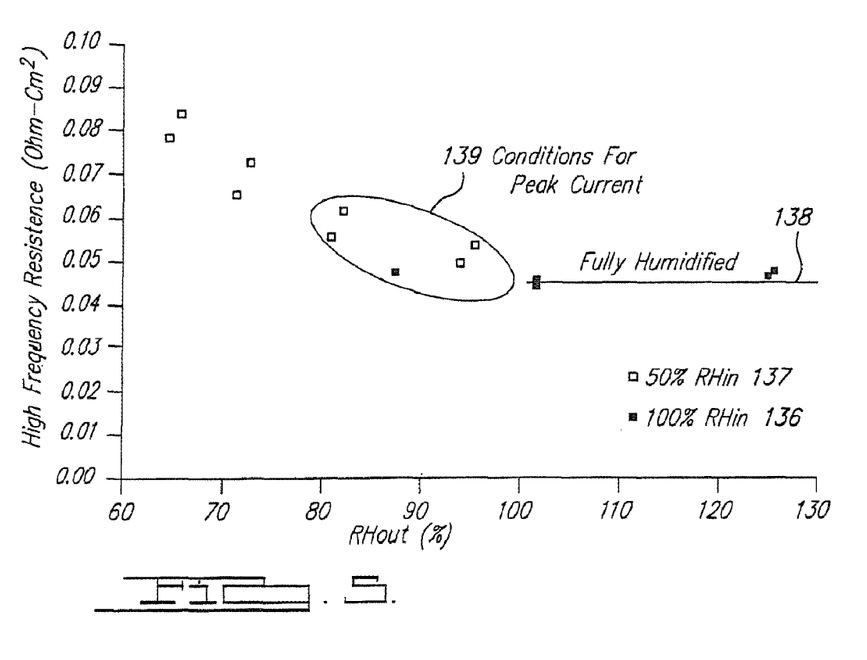
FIG. 5 is a graph of the high frequency resistance of a fuel cell as a function of the relative humidity of the cathode effluent gas exiting the fuel cell for various levels of humidity of the cathode reactant gas entering the fuel cell.

Another method of controlling fuel cell system 19 is by measuring the high frequency resistance. The high frequency resistance of the fuel cells within fuel cell stack 18 can be used to control the operation of fuel cell stack 18. Specifically, a correlation exists between the peak current densities shown in FIG. 4 and the high frequency resistance of the fuel cells within fuel cell stack 18. The correlation between the current density and the high frequency resistance of the fuel cells is a function of the cathode effluent outlet relative humidity as can be seen by comparing FIG. 5 to FIG. 4. In FIG. 5, the high frequency resistance of the fuel cell is shown as a function of the relative humidity of the cathode effluent exiting the fuel cell for both a cathode reactant inlet relative humidity of 50% and 100%. Based on this correlation, the high frequency resistance of the fuel cell can be used to determine operating conditions wherein peak current density can be achieved by the fuel cell.

Data points 136 represent the high frequency resistance of the fuel cell as a function of the relative humidity of the cathode effluent exiting the fuel cell when the cathode reactant flowing into the fuel cell is at 100% relative humidity. Similarly, data points 137 represent the high frequency resistance of the fuel cell as a function of the relative humidity of the cathode effluent exiting the fuel cell when the cathode reactant flowing into the fuel cell is at 50% relative humidity. The horizontal fully humidified line 138 represents the high frequency resistance of the fuel cell when the cathode effluent is 100% humidified and liquid water is forming in the fuel cell (thereby causing MEA to be 100% humidified). As can be seen by the data points, the high frequency resistance decreases as the cathode effluent and MEA approach a fully humidified condition at which time the high frequency resistance essentially levels out to be a constant value.

By comparing FIGS. 4 and 5, it can be seen that the high frequency resistance that corresponds to the conditions for a peak current density produced in the fuel cell occur while the high frequency resistance is still decreasing as a function of the relative humidity of the cathode effluent exiting the fuel cell. The circle region 139 corresponds to the high frequency resistance of the fuel cell at conditions that allow for the peak current density to be achieved by the fuel cell. Thus, the high frequency resistance can be correlated to the operating conditions of the fuel cell that result in conditions for peak current generation (density) by the fuel cell. Accordingly, a measure of high frequency resistance can be used to predict the performance of the fuel cell and the operation of the fuel cell can be adjusted based on the high frequency resistance to maintain operation in the desired high frequency resistance range.

Figure 7:
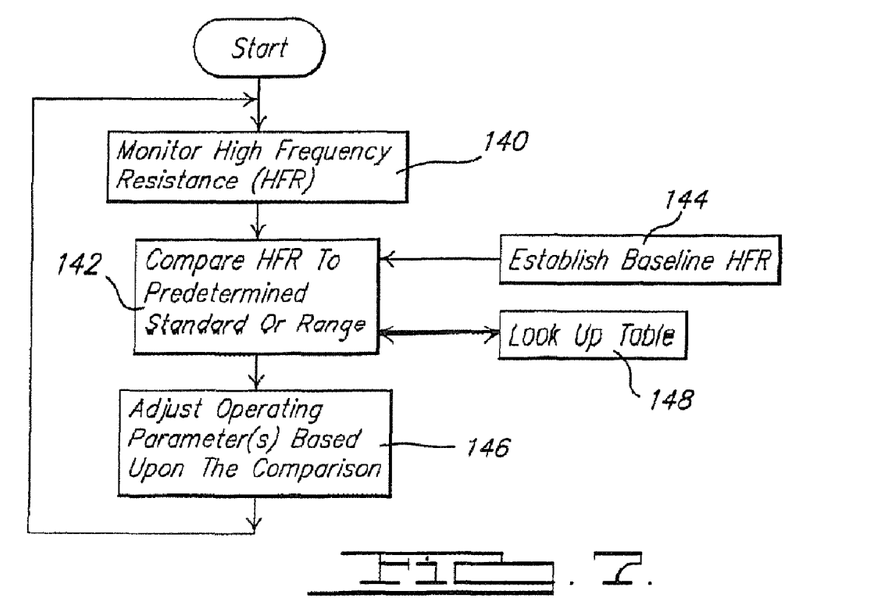
FIG. 7 is a flow chart illustrating the use of high frequency resistance to control a fuel cell system according to the principles of the present invention.

Referring to FIG. 7, the use of high frequency resistance to control the operation of the fuel cells to maintain a desired operation of fuel cell stack 18 is shown. Upon starting operation of fuel cell stack 18 and fuel cell system 19, the high frequency resistance of fuel cell stack 18 is monitored, as indicated in block 140. The high frequency resistance is then compared to a predetermined standard or range, as indicated in block 142.

The high frequency resistance for a particular fuel cell and/or fuel cell stack will vary depending upon the design and configuration of the fuel cell and/or fuel cell stack. Accordingly, the value of the high frequency resistance as a function of the relative humidity in the cathode effluent exiting the fuel cells is not a universal value that is applicable to all fuel cells and fuel cell stacks. Thus, the predetermined standard will vary based upon the particular design and configuration of the fuel cell and/or fuel cell stack. It should be appreciated, however, that the shape of the curve of the high frequency resistance as a function of the relative humidity of the cathode effluent exiting the fuel cells is similar from one fuel cell/fuel cell stack to the next. That is, the high frequency resistance will decline as the relative humidity of the cathode effluent increases and achieve a substantially constant or steady value once the cathode effluent (and MEA) is fully humidified. Thus, the general trends exhibited by the representation in FIG. 5 can be used to establish a predetermined standard or operating range for the fuel cells and/or fuel cell stack. Accordingly, the specific value or range for high frequency resistance that achieves a desired operating condition or state for a particular fuel cell and/or fuel cell stack will be established for each fuel cell stack.

One way to determine the high frequency resistance values or range of values that achieve a desired operating condition for a particular fuel cell and/or fuel cell stack is to establish a baseline high frequency resistance upon a cold start of the fuel cell and/or fuel cell stack, as indicated in block 144. To establish this baseline high frequency resistance, when the fuel cell and/or fuel cell stack are started cold, flooding will initially occur wherein the cathode effluent exits the fuel cell stack with 100% or more relative humidity. The high frequency resistance is determined during this flooding condition. As stated above, when the cathode effluent is fully humidified, the high frequency resistance is substantially constant. Thus, this flooded high frequency resistance can be used as a baseline and as a comparison to determine appropriate adjustments to the operating parameters of the fuel cell and/or fuel cell stack to obtain a desired performance. Specifically, adjustments are then made to the operating parameters, such as the temperature of the cathode reactant through the cathode flow path, the inlet relative humidity of the cathode reactant, and the stoichiometric quantity of cathode reactant flowing into the fuel cell/fuel cell stack, as indicated in block 146. The adjustments are chosen so that drier operation of the fuel cell stack is achieved and the relative humidity of the cathode effluent decreases. The high frequency resistance is continued to be monitored, as indicated in block 140, and again compared to the baseline high frequency resistance, as indicated in block 142. Based upon this comparison, additional adjustments are made to the operating parameters as indicated in block 146. This closed-loop feedback controller, as indicated in blocks 140, 142 and 146, continues using the baseline high frequency resistance as established in block 144.

When the relative humidity of the cathode effluent has been sufficiently reduced, the high frequency resistance will begin to increase, as represented in the graph of FIG. 5. The operation of fuel cell and/or fuel cell stack continues to be controlled so that the high frequency resistance operates at a value in excess of the baseline high frequency resistance established during the cold start. Because the peak conditions for current density occur just prior to the fully humidified state, the operation of fuel cell and/or fuel cell stack can be controlled to a limited range based on that baseline high frequency resistance value and operated to achieve desired operational performance of the fuel cell and/or fuel cell stack.

As an alternative to establishing a baseline high frequency resistance at a cold start, a look up table can be used to provide the predetermined standard or range of high frequency resistance with which to compare, as indicated in block 148. The look up table uses empirical data that is relevant for the particular fuel cell and/or fuel stack that is being controlled. The particular fuel cell/fuel cell stack or a representative fuel cell/fuel cell stack of a comparable design can be operated or bench tested under a variety of conditions and the high frequency resistance as a function of the cathode effluent relative humidity for various operating parameters can be recorded. Based on these observations, a table of empirical data can be generated that can be accessed by controller 96 while operating the fuel cell system. The data in the look up table can be used as the predetermined standard or range with which to compare the high frequency resistance observed, as indicated in block 142. The empirical data in the look up table provides a desired operation of the fuel cell and/or fuel cell stack, such as achieving maximum current densities out of the fuel cells. Based upon this comparison, adjustments to the operating parameters of the fuel cell/fuel cell stack are then made, as indicated in block 146. A closed-loop feedback control scheme then ensues wherein the high frequency resistance is monitored, compared to the predetermined standard or range from the look up table and operation of the fuel cell/stack are adjusted based upon the comparison, as indicated in blocks 140, 142, 146.

The high frequency resistance can also be used to supplement the use of the theoretical model to control the operation of fuel cell stack 18. As stated above, measuring or determining the relative humidity of the cathode reactant flowing into the fuel cells, at times, may be impossible or difficult to ascertain. For example, when WVT device 92 is being used and fuel cell stack 18 is being started in a cold condition, the performance of WVT device 92 may be difficult to ascertain. Thus, the ability to quantify the relative humidity of the cathode reactant flowing into fuel cell stack 18 may be difficult or impossible. To quantify the relative humidity of the cathode reactant, a measure of the high frequency resistance can be used to approximate the relative humidity of the cathode reactant flowing into the fuel cell stack so long as the relative humidity of the cathode effluent is less than 100%. The approximation is based on the correlation exhibited in FIG. 5. Specifically, empirical data of the performance of the fuel cell stack or a comparable fuel cell stack can be recorded for the various operating conditions of the fuel cell stack. Based upon this empirical data, the relative humidity of the cathode reactant flowing into the fuel cell stack can be ascertained based upon the measure of high frequency resistance and the values of the other operating parameters of the fuel cell stack that influence the high frequency resistance. Thus, the measure of high frequency resistance can be used to approximate the value of the relative humidity of the cathode reactant.

The high frequency resistance can then continue to be used to provide an approximation for the relative humidity of the cathode reactant until such time as the operation of WVT device 92 is such that the relative humidity of the cathode reactant can be determined without using the high frequency resistance measurement.

Thus, the high frequency resistance can be used as a measure of the performance of the fuel cell/fuel cell stack and adjustments to the operation of the fuel cell/stack can be made to maintain the operation in a desired range. This range can be selected to correspond to desirable operating conditions, such as peak current densities. The high frequency resistance can also be used in a closed-loop feedback process wherein, based upon the high frequency measurement, the controller adjusts one or more operating parameters of a fuel cell/stack based on the closed-loop feedback. Furthermore, the high frequency resistance can be used to supplement the theoretical model to provide approximations of the relative humidity of the cathode reactant flowing into the fuel cell/fuel cell stack.

As stated above, various operating parameters can be adjusted to control the relative humidity profile that occurs within the fuel cells. The adjustment to the temperature of the gas flowing through the cathode flow path affects its water vapor holding capacity. As the temperature of the gas flowing through the cathode flow path increases, a larger quantity of water vapor may be held by the gas prior to becoming saturated and as the temperature decreases, a lower quantity of water vapor may be held prior to becoming saturated. Thus, by changing the temperature of the gas flowing through the cathode flow path, the water vapor capacity can be changed to allow for a desired relative humidity to be achieved within the cathode flow path and of the MEA. To adjust the temperature of the gas flowing through the cathode flow path, the operation of the coolant system is adjusted. Specifically, in the co-flow arrangement discussed above, the coolant and the gas in the flow path are substantially the same. Thus, by increasing or decreasing the flow rate of the coolant and/or the temperature of the coolant, the temperature profile of the gas throughout the cathode flow path can be adjusted. Adjustment of coolant inlet temperature can be accomplished through the use of in-line heaters and/or bypassing of the radiator.

Adjusting the relative humidity of the cathode reactant flowing into the fuel cell stack also affects the humidity within the cathode flow path. Specifically, by adjusting the relative humidity of the cathode reactant, the inlet portion of the cathode flow field can be adequately humidified to achieve a desired operation while also balancing this against the total water vapor holding capacity of the cathode reactant to achieve a desired relative humidity profile throughout the stack. Adjusting the relative humidity of the cathode reactant can be performed by a humidifying device, such as a WVT device discussed above.

The pressure drop across the cathode flow path also affects the water vapor holding capacity of the gas therein. The water vapor holding capacity is inversely related to the pressure of the gas. Thus, as the pressure increases, the water vapor holding capacity decreases and as the pressure decreases, the water vapor holding capacity increases. Thus, by adjusting the pressure within the cathode flow path, the water holding capacity of the gas therein can be adjusted to allow for additional water holding capacity or less water holding capacity to achieve a desired relative humidity. The pressure of the cathode flow path can be adjusted by throttling the flow therethrough with various valves or other flow restricting devices (not shown) and/or increasing the pressure output of the compressor or the cathode reactant supplying device.

The stoichiometric quantity of cathode reactant can also be adjusted. The larger the stoichiometric quantity of cathode reactant flowing through the cathode flow path, the larger the quantity of water vapor that can be held therein and removed from the fuel cells. In contrast, the lower the stoichiometric quantity of cathode reactant flowing through the cathode flow path, the less water vapor that can be held and removed from the fuel cells. Thus, by adjusting the stoichiometric quantity of cathode reactant flowing through the cathode flow path, a larger or lesser quantity of water produced by the fuel cell can be held by the gas and removed therefrom with the cathode effluent. The stoichiometric quantity can be adjusted by varying the output of the compressor or cathode reactant supply device.

The description of the present invention is merely exemplary in nature and, thus, variations that do not depart from the gist of the invention are intended to be within the scope of the invention. For example, the configuration and components of fuel cell system 19 can vary from that shown. Humidifying devices other than WVT device 92 can be employed. Additionally, the use of heat exchanger 94 is optional and does not need to be present. Thus, such variations are not to be regarded as a departure from the spirit and scope of the invention.

What is claimed is:

1. A method of operating a fuel cell to maintain a desired relative humidity in the fuel cell, the fuel cell having anode and cathode reactant flow paths separated by a proton exchange membrane and a coolant flow path, the cathode reactant and coolant flow paths being in a substantially predominate co-flow arrangement relative to each other, the method comprising:
   (a) monitoring a high frequency resistance of the fuel cell;
   (b) comparing said high frequency resistance to a predetermined standard or range; and
   (c) adjusting an operating parameter of the fuel cell to maintain the desired relative humidity in the fuel cell based upon said comparison, said operating parameter including at least one of a temperature change of a cathode reactant across the cathode flow path, a stoichiometric quantity of a cathode reactant flowing into the fuel cell, and a pressure drop across the cathode reactant flow path.

2. The method of claim 1, further comprising using said high frequency resistance as a closed-loop feedback and wherein (c) includes adjusting said operating parameter based on said closed-loop feedback.

3. The method of claim 1, further comprising establishing said predetermined standard or range.

4. The method of claim 3, wherein establishing said predetermined standard includes using a high frequency measurement of the fuel cell when cathode effluent exiting the fuel cell is saturated as said predetermined standard.

5. The method of claim 4, wherein (c) includes adjusting said operating parameter to cause said high frequency resistance to exceed said predetermined standard.

6. The method of claim 1, wherein said predetermined standard or range is based upon empirical data and (b) includes accessing a look up table containing said predetermined standard or range.

7. The method of claim 1, wherein (c) includes maintaining a relative humidity of a gas flowing through the cathode flow path in the fuel cell below 100% when operating at a nominal operating temperature.

* * * * *